(12) United States Patent
Falk et al.

(10) Patent No.: US 10,147,565 B2
(45) Date of Patent: Dec. 4, 2018

(54) VERTICAL INTERLOCK SYSTEM

(71) Applicant: Mitsubishi Electric Power Products, Inc., Warrendale, PA (US)

(72) Inventors: Edward G. Falk, Plum, PA (US); Jordan Liebert, West Mifflin, PA (US); Nathan Riemer, Grove City, PA (US)

(73) Assignee: Mitsubishi Electric Power Products, Inc., Warrendale, PA (US)

( * ) Notice: Subject to any disclaimer, the term of this patent is extended or adjusted under 35 U.S.C. 154(b) by 354 days.

(21) Appl. No.: 15/223,932

(22) Filed: Jul. 29, 2016

(65) Prior Publication Data

US 2018/0033568 A1    Feb. 1, 2018

(51) Int. Cl.
*H01H 9/26*  (2006.01)
*H02J 9/06*  (2006.01)

(52) U.S. Cl.
CPC ......... *H01H 9/26* (2013.01); *H01H 2300/018* (2013.01); *H02J 9/061* (2013.01)

(58) Field of Classification Search
CPC ...... H01H 9/26; H01H 2300/018; H02J 9/061
See application file for complete search history.

(56) References Cited

U.S. PATENT DOCUMENTS

| | | | |
|---|---|---|---|
| 784,064 A | 3/1905 | Nordenberg | |
| 836,994 A | 11/1906 | Rider | |
| 1,279,168 A | 9/1918 | Smith | |
| 2,108,634 A | 2/1938 | Wilms | |
| 2,756,612 A | 7/1956 | Schleicher | |
| 2,866,871 A | 12/1958 | Tancred | |
| 3,416,107 A * | 12/1968 | Anderson | H01H 3/26 335/11 |
| 5,725,085 A * | 3/1998 | Seymour | H01H 9/26 200/50.33 |
| 5,879,036 A | 3/1999 | Moline et al. | |
| 6,043,439 A * | 3/2000 | Crooks | H01H 9/26 200/50.32 |
| 6,617,533 B1 * | 9/2003 | Lawson | H01H 9/26 200/50.32 |
| 7,834,724 B2 | 11/2010 | Rane et al. | |
| 8,648,269 B2 * | 2/2014 | Steele | H01H 9/26 200/43.01 |

* cited by examiner

*Primary Examiner* — Jared Fureman
*Assistant Examiner* — Michael Warmflash
(74) *Attorney, Agent, or Firm* — Posz Law Group, PLC (57) ABSTRACT

A vertical interlock system, comprising: a power supply generating a bypass signal; a first breaker connected to the power supply and controlled by a first switch; a second breaker connected to the power supply and controlled by a second switch, the second breaker being located above the first breaker; a control lever having a first orientation and a second orientation; and a fixer for locking the control lever in either the first or second orientation, wherein when the control lever is in the first orientation the first switch is locked closed, when the control lever is in the second orientation the second switch is locked closed position, when the first switch is open, the control lever cannot be placed in the first orientation, and when the second switch is open, the control lever cannot be placed in the second orientation.

20 Claims, 6 Drawing Sheets

VERTICAL INTERLOCK SYSTEM

FIELD OF THE INVENTION

The present disclosure relates in general to an interlock system, and more particularly to a vertical interlock system for use in bypassing an uninterrupted power supply (UPS).

BACKGROUND OF THE INVENTION

An interlock is a feature that makes the state of two mechanisms or functions mutually dependent. It may be used to prevent undesired states in a finite-state machine, and may consist of any electrical, electronic, or mechanical devices or systems. In most applications, an interlock is used to help prevent a machine from harming its operator or damaging itself by preventing one element from changing state due to the state of another element, and vice versa.

One particular area in which interlock systems are used is in the area of power supplies. When multiple uninterrupted power supplies (UPSs) are connected in series, it is necessary to bypass one of the UPSs before it is taken off-line in order that power is not cut off to the entire system. In order to bypass a UPS in such a power system, it is necessary to flip a number of switches in a particular order to prevent a break in the power line.

The current industry-standard in interlock systems is to provide trapped key interlocks forcing the user to use the key and follow a particular sequence to bypass a UPS. Trapped key interlocking is a method of ensuring safety in industrial environments by forcing the operator through a predetermined sequence using a defined selection of keys, locks and switches.

It is called "Trapped Key" because it works by releasing and trapping keys in a predetermined sequence. After the UPS has been isolated, a key is released that can be used to grant access to a switch that will isolate the UPS from the power system. This allows maintenance or replacement of a given UPS.

However, this is a cumbersome process that involves using and turning keys, which must be placed in the proper order and turned in the proper order before necessary switches can be flipped. It is also a system that leaves open the possibility of error if the sequence is not followed and the keys are turned in the wrong order.

It would therefore be desirable to provide a less cumbersome and more secure way of providing an interlock system.

SUMMARY OF THE INVENTION

A vertical interlock system, is provided, comprising: a power supply configured to generate a bypass signal when the power supply is in a bypass mode; a first breaker connected to the power supply and controlled by a first switch, the first switch having a first open position that opens the first breaker and a first closed position that closes the first breaker; a second breaker connected to the power supply and controlled by a second switch, the second switch having a second open position that opens the second breaker and a second closed position that closes the second breaker, the second breaker being located above the first breaker; a control lever having a first orientation and a second orientation; and a fixer configured to lock the control lever in one of the first and second orientations unless it receives both the bypass signal and a lever release signal, wherein when the control lever is in the first orientation the first switch is locked in the first closed position, when the control lever is in the second orientation the second switch is locked in the second closed position, when the first switch is in the first open position, the control lever cannot be placed in the first orientation, and when the second switch is in the second open position, the control lever cannot be placed in the second orientation.

One of the first breaker and the second breaker can be a power breaker connected in series with the power supply, and the other of the first breaker and the second breaker can be a bypass breaker connected in parallel with the power supply.

The bypass breaker can be located in parallel with the power supply and the power breaker.

The control arm can further include a first arm affixed to a first end of the control lever; and a second arm affixed to a second end of the control lever opposite to the first end.

The control arm may further include a first blocker attached to the first arm, the first blocker being configured to prevent the first switch from moving from the first closed position to the first open position when the control lever is in the first orientation, and a second blocker attached to the second arm, the second blocker being configured to prevent the second switch from moving from the second closed position to the second open position when the control lever is in the second orientation.

The first blocker may be a first pin extending perpendicularly from the first arm, and the second blocker may be a second pin extending perpendicularly from the second arm.

The control lever may be configured to be moved from the first orientation to the second orientation by hand by a human operator.

The control lever may further comprise a handle configured to assist in moving the control lever from the first orientation to the second orientation.

The fixer may include a solenoid configured to move a locking pin from a first pin position to a second pin position in response to the bypass signal and the lever release signal, and the control lever may include an opening located proximate to a midpoint of the control lever, the opening being configured to receive the locking pin when the locking pin is in the second pin position, and when the locking pin is in the second pin position and is inserted in the opening, the control lever may be locked and cannot change between the first and second orientations.

The fixer may further include a solenoid activator configured to generate the lever release signal when activated; and a solenoid controller configured to generate a solenoid control signal upon receiving both the bypass signal and the lever release signal, and the solenoid may be configured to move the locking pin to a second pin position when it receives the solenoid control signal, and move the locking pin to the first pin position when it does not receive the solenoid control signal.

The solenoid activator may be one of a button, a switch, or a lever.

The locking pin can only be placed into the opening when the control lever is in the first orientation or the second orientation.

The opening may have an opening shape of first and second overlapping shapes, when the control lever is in the first orientation, the locking pin is configured to fit into the first overlapping shape when the locking pin is in the second pin position, and when the control lever is in the second orientation, the locking pin is configured to fit into the second overlapping shape when the locking pin is in the second pin position.

The first and second overlapping shapes may be circles.

A vertical interlock system is provided, comprising: a power supply configured to generate a bypass signal when the power supply is in a bypass mode; a first breaker connected to the power supply and controlled by a first switch, the first switch having a first open position and a first closed position; a second breaker connected to the power supply and controlled by a second switch, the second switch having a second open position and a second closed position, the second breaker being located above the first breaker; a solenoid configured to move a locking pin from a first pin position to a second pin position in response to a solenoid control signal; a solenoid activator configured to generate a lever release signal when activated; a solenoid controller configured to generate the solenoid control signal upon receiving both the bypass signal and the lever release signal; a control lever having a first orientation and a second orientation, the control lever including a first arm affixed to a first end of the control lever; a second arm affixed to a second end of the control lever opposite to the first end; a center pivot located proximate to a midpoint of the control lever, the control lever being configured to partially rotate around the pivot; and an opening located proximate to a midpoint of the control lever, the opening being configured to receive the locking pin when the locking pin is in the second pin position, wherein when the control lever is in the first orientation the first switch is locked in the first closed position, when the control lever is in the second orientation the second switch is locked in the second closed position, when the first switch is in the first open position, the control lever cannot be placed in the first orientation, when the second switch is in the second open position, the control lever cannot be placed in the second orientation, and when the locking pin is in the second pin position and is inserted in the opening, the control lever is locked and cannot change between the first and second orientations.

One of the first breaker and the second breaker may be a power breaker connected in series with the power supply, and the other of the first breaker and the second breaker may be a bypass breaker connected in parallel with the power supply.

The bypass switch may be located in parallel with the power supply and the power switch.

The solenoid may be configured to move the locking pin to a second pin position when it receives the solenoid control signal, and move the locking pin to the first pin position when it does not receive the solenoid control signal.

The first pin position may be an extended position, and the second pin position may be a retracted position.

The first pin position may be a retracted position, and the second pin position may be an extended position.

The solenoid activator may be one of a button, a switch, or a lever.

The control lever may be configured to be moved from the first orientation to the second orientation by hand by a human operator.

In some embodiments, the locking pin can only be placed into the opening when the control lever is in the first orientation or the second orientation.

The control lever may further comprise a handle configured to assist in moving the control lever from the first orientation to the second orientation.

The opening may have an opening shape of first and second overlapping shapes, when the control lever is in the first orientation, the locking pin is configured to fit into the first overlapping shape when the locking pin is in the second pin position, and when the control lever is in the second orientation, the locking pin is configured to fit into the second overlapping shape when the locking pin is in the second pin position.

The first and second overlapping shapes may be circles.

The center pivot may comprise a center hole in the control lever, and a center fixed fastener located in the center hole.

The first arm may be attached to a first pivot, the first pivot including a first arm hole located in the first arm, a first control lever hole located in the control lever, and a first fixed fastener located in the first arm hole and the first control lever hole, and the second arm may be attached to a second pivot, the second pivot including a second arm hole located in the second arm, a second control lever hole located in the control lever, and a second fixed fastener located in the second arm hole and the second control lever hole.

The first arm may include a first blocker configured to prevent the first switch from moving from the first closed position to the first open position when the control lever is in the first orientation, and the second arm may include a second blocker configured to prevent the second switch from moving from the second closed position to the second open position when the control lever is in the second orientation.

The first blocker may be a first pin extending perpendicularly from the first arm, and the second blocker may be a second pin extending perpendicularly from the second arm.

A method of controlling a power supply is provided, comprising: locking a control lever into a first orientation; locking a first switch on a first breaker in a first closed position while the control lever is in the first orientation, thereby closing the first breaker, the first breaker being connected to the power supply; generating a bypass signal at the power supply; switching a second switch on a second breaker from a second open position to a second closed position, thereby closing the second breaker, the bypass breaker being connected to the power supply; generating a lever release signal; unlocking the control lever from the first orientation upon receiving both the bypass signal and the lever release signal; moving the control lever from the first orientation to a second orientation after unlocking the control lever from the first orientation, thereby unlocking the first switch from the first closed position, and locking the second switch into the second closed position; stopping the generation of the locking pin shift signal; locking the control lever in the second orientation upon failing to receive both the bypass signal and the lever release signal; and switching the first switch from the first closed position to the first open position, thereby opening the first breaker.

The control lever may be locked into the first orientation by instructing a solenoid to place a locking pin in an opening in the control lever, and the control lever may be unlocked from the first orientation by instructing the solenoid to remove the locking pin from the opening.

In some embodiments, the locking pin can only be placed into the opening when the control lever is in the first orientation or the second orientation and not between the first and second orientations.

The opening may have an opening shape of first and second overlapping shapes, when the control lever is in the first orientation, the locking pin is configured to fit into the first overlapping shape when the locking pin is in the second pin position, and when the control lever is in the second orientation, the locking pin is configured to fit into the second overlapping shape when the locking pin is in the second pin position.

The first and second overlapping shapes may be circles.

The lever release signal may be generated by having a user activate a solenoid activator, and the lever release signal may be stopped being generated by having a user de-activate the solenoid activator.

The solenoid activator may be one of a button, a switch, or a lever.

The first breaker may be a power breaker connected in series with the power supply, and the second breaker may be a bypass breaker connected in parallel with the power supply.

The first breaker may be a bypass breaker connected in parallel with the power supply, and the second breaker may be a power breaker connected in series with the power supply.

The moving of the control lever from the first orientation to the second orientation may be performed by hand by a human operator.

BRIEF DESCRIPTION OF THE DRAWINGS

The accompanying figures where like reference numerals refer to identical or functionally similar elements and which together with the detailed description below are incorporated in and form part of the specification, serve to further illustrate an exemplary embodiment and to explain various principles and advantages in accordance with the present invention.

DETAILED DESCRIPTION

The instant disclosure is provided to further explain in an enabling fashion the best modes of performing one or more embodiments of the present invention. The disclosure is further offered to enhance an understanding and appreciation for the inventive principles and advantages thereof, rather than to limit in any manner the invention. The invention is defined solely by the appended claims including any amendments made during the pendency of this application and all equivalents of those claims as issued.

It is further understood that the use of relational terms such as first and second, and the like, if any, are used solely to distinguish one from another entity, item, or action without necessarily requiring or implying any actual such relationship or order between such entities, items or actions. It is noted that some embodiments may include a plurality of processes or steps, which can be performed in any order, unless expressly and necessarily limited to a particular order; i.e., processes or steps that are not so limited may be performed in any order.

Although the embodiments below describe the system for bypassing an uninterrupted power supply (UPS) in a system containing multiple UPSs in series, it should not be limited to such a system. The disclosed interlock system is applicable to any device that requires an interlock system.

Interlock System

Figure 1:
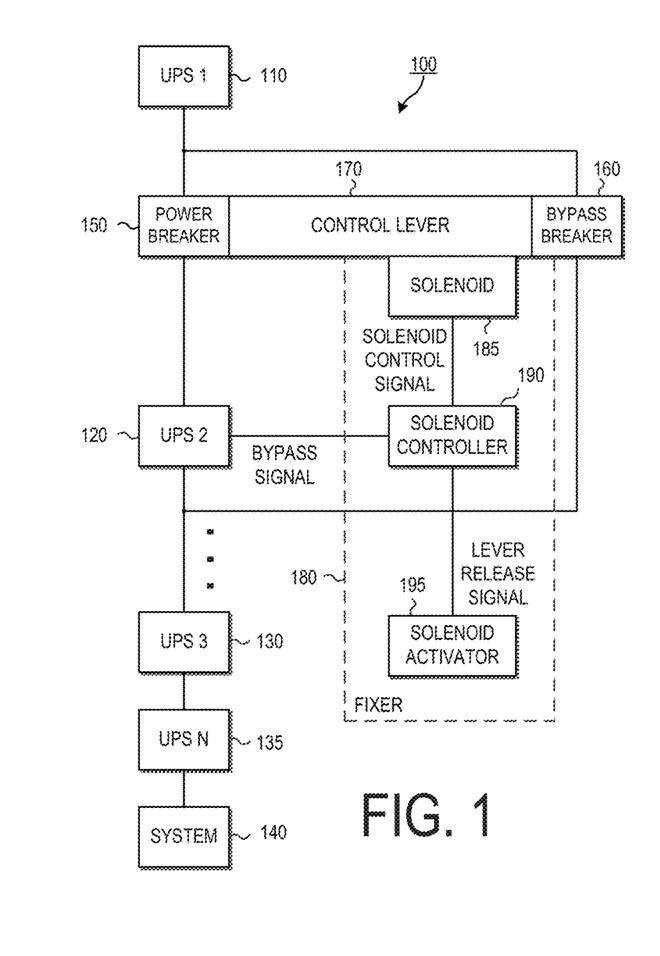
FIG. 1 is a block diagram of an interlock system according to a disclosed embodiment.

FIG. 1 is a block diagram of an interlock system 100 according to a disclosed embodiment. As shown in FIG. 1, an interlock system 100 includes first through $N^{th}$ uninterrupted power supplies (UPSs) 110, 120, 130, 135, a system to be powered 140, a power breaker 150, a bypass breaker 160, a control lever 170, and a fixer 180. The fixer 180 further includes a solenoid 185, a solenoid controller 190, and a solenoid activator 195.

The first through $N^{th}$ UPSs 110, 120, 130, 135 each provide power to the system 140. They are connected in series, and any given UPS 110, 120, 130, 135 should be removed from the series connection before it is shut down, lest the entire power line be short-circuited and power be cut off to the system 140.

Each UPS 110, 120, 130, 135 generates a bypass signal that indicates whether or not the UPS 110, 120, 130, 135 should be bypassed by a corresponding bypass breaker 160. This is shown, by way of example, with respect to the second UPS 120. However, each of the other UPSs 110, 130, 135 could also generate such a bypass signal to a corresponding fixer 180.

Although this embodiment discloses the use of first through $N^{th}$ UPSs 110, 120, 130, 135 in series, alternate embodiments could use more or fewer UPSs. The present system is also applicable to a single UPS 120, even if it were not in series with any other UPSs.

The system 140 to be powered can be any system requiring power. In some embodiments may be a system for which constant power is required. For example the system 140 could be a computer bank that needs constant power or else data will be lost, medical equipment supplying life support, or any system that needs constant power.

The power breaker 150 is located directly between the first UPS 110 and the second UPS 120. When closed it connects the first UPS 110 to the second UPS 120; when open, it provides a short circuit between the first UPS 110 and the second UPS 120.

The bypass breaker 160 is located between the first UPS 110 and the third UPS 130. When closed it connects the first UPS 110 to the third UPS 130, bypassing the second UPS 120; when open, it provides a short circuit between the first UPS 110 and the third UPS 130.

When the power breaker 150 is closed and the bypass breaker 160 is open, the second UPS 120 is connected in series between the first UPS 110 and the third UPS 130. When the power breaker 150 is open and the bypass breaker 160 is closed, the first UPS 110 is connected in series with the third UPS 130, and the second UPS 120 is removed from the series connection. When the power breaker 150 is closed and the bypass breaker 160 is closed, the first UPS 110 is still connected in series between the first UPS 110 and the third UPS 130, but the bypass breaker 160 provides a direct power line from the first UPS 110 to the third UPS 130, bypassing the second UPS 120.

If, however, the power breaker 150 and the bypass breaker 160 were both open, then there would be a short circuit between the first UPS 110 and the third UPS 130. Since this might interrupt power to the system 140, one of the power breaker 150 and the bypass breaker 160 should always be closed.

The control lever 170 moves between first and second orientations in which it locks either the power breaker 150 or the bypass breaker 160 in a closed position. In this particular embodiment, the first orientation locks the power breaker 150 in the closed position and the second orientation locks the bypass breaker 160 in the closed position. However this is by way of example only. In alternate embodiments, the first and second orientations could be reversed.

The fixer 180 operates to hold the control lever 170 in its current orientation (i.e., the first or second orientation). When in a fixed state, the fixer 180 prevents the control lever 170 from moving between the first and second orientations. When in a release state, however, the fixer 180 allows the control lever 170 to move between the first and second orientations.

In the current disclosed embodiment, the fixer 180 employs a solenoid 185 to indicate whether it is in the fixed or release state. However, alternate embodiments could use alternate means of fixing the control lever 170, for example, an electrical or pneumatic actuator.

The solenoid 185 is an electromagnetic device that moves a locking pin between an extended position (corresponding to the fixed state) and a retracted position (corresponding to the release state). When the locking pin is in an extended position, it interacts with the control lever 170 in such a way that the control lever 170 cannot move between the first and second orientations. When the locking pin is in a retracted position, it ceases interacting with the control lever 170, and allows the control lever 170 to move between the first and second orientations.

In the disclosed embodiment, the solenoid controller 190 operates in response to a bypass signal from the second UPS 120 and a lever release signal from the solenoid activator 195. It operates to switch the locking pin from the retracted position to the extended position and vice versa. In particular the solenoid controller will only move the locking pin to the released position when both the bypass signal and the lever release signal both indicate that it is proper to do so.

The solenoid activator 195 operates to generate the lever release signal, which indicates that the solenoid 185 should be placed in a release state, allowing the control lever 170 to move freely between the first and second orientations. In various embodiments, the solenoid activator can be a button, a switch, lever, or the like. A system user must activate the solenoid activator 195 before the control lever 170 can be moved. This serves as a failsafe against the control lever 170 being moved at an inappropriate time.

Although the fixer 180 is described above as the device including a solenoid, alternate embodiments can be implemented without using a solenoid. For example, such alternate embodiments could include an electrical or pneumatic actuator as a fixer.

Figure 2:
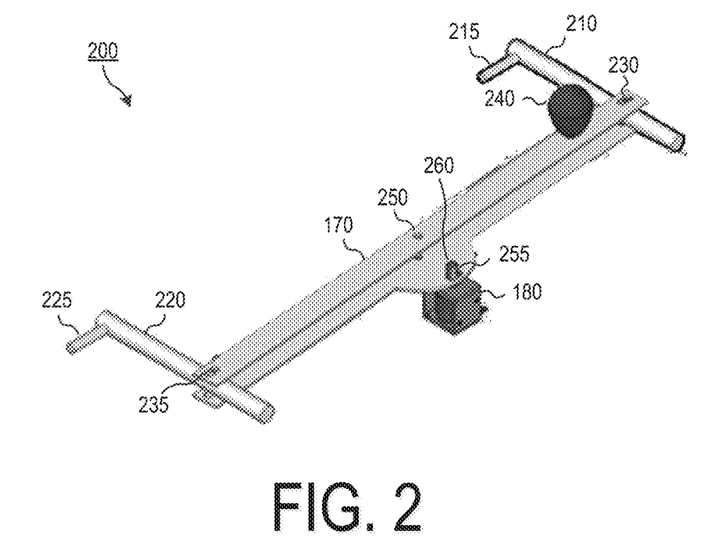
FIG. 2 is a plan view of a portion of an interlock system according to a disclosed embodiment.

FIG. 2 is a plan view of a portion of an interlock system 200 according to a disclosed embodiment. As shown in FIG. 2, the interlock system 200 includes the control lever 170, the fixer 180, a first arm 210 having a first pin 215, a second arm 220 having a second pin 225, first and second attachment elements 230, 235, a handle 240, a pivot 250, an opening 255 in the control lever 170, and a locking pin 260.

The control lever 170 moves around the pivot 250 between the first orientation and a second orientation. In various embodiments, the control lever 170 can be a single piece or it may be two separate pieces formed on either side of the first and second arms 210, 220, connected by the first and second attachment elements 230, 235, and the pivot 250.

The fixer 180 operates to selectively fix the control lever 170 in one of the first and second orientations. In this embodiment, the fixer 180 operates by placing the locking pin 260 into either an extended or retracted position. When the locking pin 260 is in the retracted position, the control lever 170 can move between the first and second orientations; when the locking pin 260 is in the extended position, it is inserted into the opening 255, and the control lever 170 cannot move between the first and second orientations.

The first arm 210 extends out from the control lever 170 toward one of the power breaker switch or the bypass breaker switch (not shown).

The first pin 215 extends out from the first arm 210 in a position such that it will interfere with an associated switch if the switch is in a position indicating that an associated breaker is open and a user attempts to move the control lever 170 into a position proximate to the switch.

The second arm 220 extends out perpendicular from the control lever 170 toward the other power breaker switch or the bypass breaker switch (not shown).

The second pin 225 extends out from the second arm 220 in a position such that it will interfere with an associated switch if the switch is in a position indicating that an associated breaker is open and a user attempts to move the control lever 170 into a position proximate to the switch.

The first and second attachment elements 230, 235 serve to attach the first and second arms 210, 220, respectively, to the control lever 170. The first and second arms 210, 220 are attached to the control lever 170 such that they can remain level as the control lever 170 moves back and between the first orientation and the second orientation.

The handle 240 is attached to the control lever 170 and is provided to allow a user to more easily move the control lever 170 between the first and second orientations.

The pivot 250 is located proximate to the center point of the control lever 170 and allows the control lever 170 to pivot between the first and the second orientations.

The opening 255 is provided in the control lever 170 proximate to the pivot 250. It is arranged such that it can receive the locking pin 260 in either of the first or second orientations, and such that it will prevent movement of the control lever 170 when the locking pin 260 is located in the opening 255 in either of the first or second orientations.

In this disclosed embodiment, the locking pin 260 is controlled by the fixer 180. When the solenoid 185 in the fixer 180 is in an extended position, the locking pin 260 is inserted into the opening 255, fixing the control lever 170 and its current orientation. When the solenoid 185 in the fixer 180 is in a retracted position, the locking pin 260 is removed from the opening 255, allowing the control lever 170 to freely move between the first and second orientations.

Figure 3:
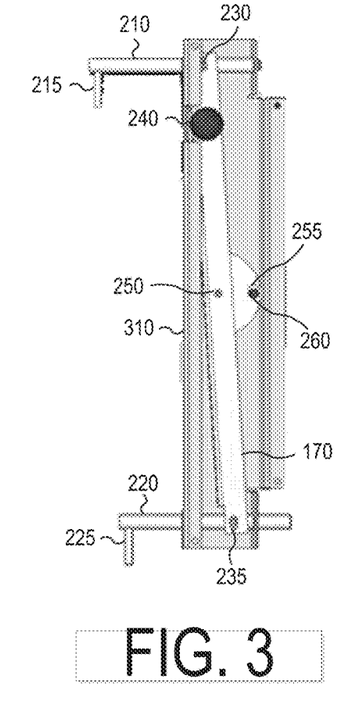
FIG. 3 is a top view of the interlock system of FIG. 2 according to a disclosed embodiment.

FIG. 3 is a top view of the interlock system 200 of FIG. 2 according to a disclosed embodiment. As shown in FIG. 2, the interlock system 200 includes the control lever 170, the fixer 180, a first arm 210 having a first pin 215, a second arm 220 having a second pin 225, first and second attachment elements 230, 235, a handle 240, a pivot 250, an opening 255 in the control lever 170, and a locking pin 260. These elements are secured to a frame 310, which restricts the movement of the control lever 170 and the first and second arms 210, 220.

The control lever 170, fixer 180, first arm 210, first pin 215, second arm 220, second pin 225, first and second attachment elements 230, 235, handle 240, pivot 250, opening 255, and locking pin 260 all operate as described above with respect to FIG. 2, and will not be described again here.

The frame 310 is provided to restrict the movement of the control lever 170, and the first and second arms 210, 220. In particular, the frame 310 restricts the control lever 170 such that it can move between only the first and the second orientations. The frame also restricts the movement of the first and second arms 210, 220 such that they remain level with respect to a power breaker switch and a bypass breaker switch (not shown).

The frame 310 may obscure the control lever 170, the fixer 180, the first and second attachment elements 230, 235, the pivot 250, the opening 255, and the locking pin 260. However, it should allow the handle 240 to be seen and used by a system user to shift the control lever 170 between the first and second orientations. In addition, the first and second arms 210, 220 and the first and second pins 215, 225 extend outside of the frame 310, projecting toward the power breaker switch and the bypass breaker switch.

Example of Operation

FIGS. 4-7 are top views of the interlock system 200 of FIGS. 2 and 3 and illustrate the operation of the interlock system 200 according to a disclosed embodiment. Shown in FIGS. 4-7, the frame 310 is placed next to a bottom breaker 410 having a bottom breaker switch 415 and a top breaker 420 having a top breaker switch 425. In one embodiment, the top breaker is a bypass breaker and the top breaker switch 425 is a bypass breaker switch, while the bottom breaker is a power breaker and the bottom breaker switch 415 is a power breaker switch. In another embodiment, the top breaker is a power breaker and the top breaker switch 425 is a power breaker switch, while the bottom breaker is a bypass breaker and the bottom breaker switch 425 is a bypass breaker switch.

The bottom breaker switch 415 is configured such that the bottom breaker 410 is closed when the bottom breaker switch 415 is in an up position, and is open when the bottom breaker switch 415 is in a down position. Likewise, the top breaker switch 425 is configured such that the top breaker 420 is closed when the top breaker switch 425 is in an up position, and is open when the top breaker switch 425 is in a down position.

The first arm 210 extends out of the frame 310 toward the top breaker switch 425, while the second arm 220 extends out of the frame 310 toward the bottom breaker switch 415. The first arm 210 is configured to prevent the top breaker switch 425 from moving from the up position to the down position when the control lever 170 is in the first orientation. Likewise, the second arm 220 is configured to prevent the bottom breaker switch 415 from moving from the up position to the down position when the control lever 170 is in the second orientation.

The first pin 215 is arranged such that it prevents the control lever 170 from moving from the second orientation to the first orientation when the top breaker switch 425 is in the down position. Likewise, the second pin 225 is arranged such that it prevents the control lever 170 from moving from the first orientation to the second orientation when the bottom breaker switch 415 is in the down position.

Figure 4:
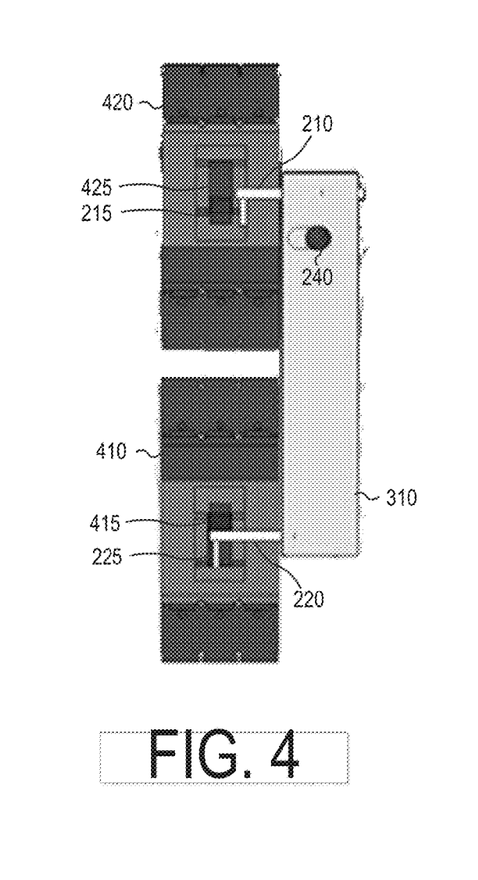
FIGS. 4-7 are top views of the interlock system of FIGS. 2 and 3 and illustrate the operation of the interlock system according to a disclosed embodiment.

FIG. 4 shows an exemplary starting position. In this starting position, the bottom breaker switch 415 is in an up position, meaning that the bottom breaker 410 is closed, while the top breaker switch 425 is in a down position, meaning that the top breaker 420 is open. The control lever 170 is in the second orientation, such that the second arm 220 is preventing the bottom breaker switch 415 from moving from the top position to the down position, thus preventing the bottom breaker 410 from being opened.

Furthermore, since the top breaker switch 425 is in the down position, the first pin 115 prevents the control lever 170 from moving from the second orientation to the first orientation. As a result, the second arm 220 will continue to lock the bottom breaker switch 415 in the up position (i.e., keeping the bottom breaker 410 closed) so long as the top breaker switch 425 remains in the down position (i.e., indicating that the top breaker is open). In this way, the bottom breaker 410 cannot be opened so long as the top breaker 420 is also open.

Figure 5:
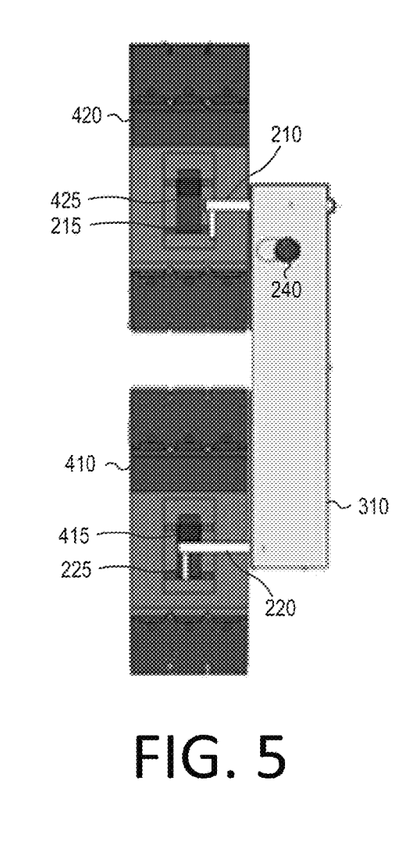

As shown in FIG. 5, the top breaker switch 425 is then moved from the down position to the up position, thus closing the top breaker 420. At this point, while the control lever 170 is still in the second orientation, the first pin 115 will no longer prevent it from moving to the first orientation. Now that both switches 415, 425 are in the up position (indicating that both breakers 410, 420 are closed), the control lever 170 may be moved between the first and second orientations, so long as the fixer 180 has also freed the control lever 170 to move.

Figure 6:
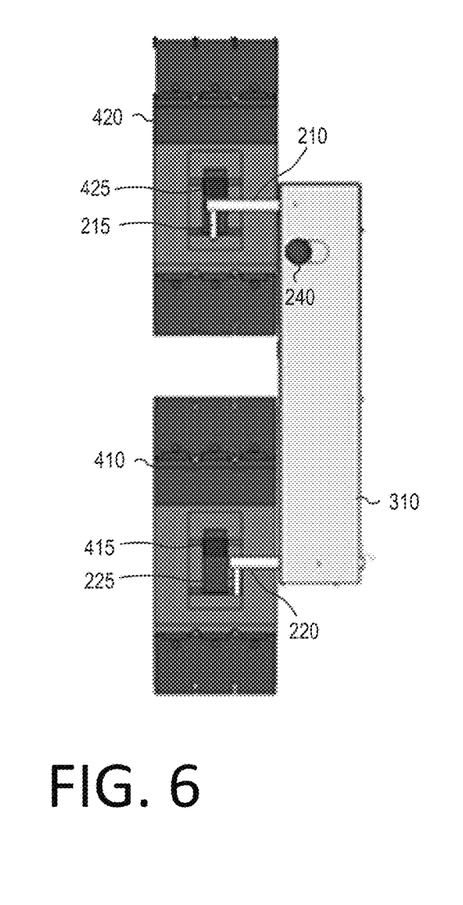

As shown in FIG. 6, the control lever 170 is then moved from the second orientation to the first orientation. In doing so, the first arm 210 now locks the top breaker switch 425 in the up position (i.e., keeping the top breaker 420 closed). The second arm 220 no longer restricts the movement of the bottom breaker switch 415.

It should be noted that the movement of the control lever 170 between the first and second orientations is accomplished by having the user grab the handle 240 and manually shift the control lever 170 from the second position to the first position. Furthermore, it should be noted that this movement can only be performed when the fixer 180 (not shown in this drawing) allows it. In this particular embodiment, this means that the locking pin 260 (not shown in this drawing) must be retracted from the opening 255 (not shown in this drawing). In this embodiment, the fixer 180 frees the control lever 170 to move when it receives a bypass signal from a UPS associated with the control lever 170, and receives a lever release signal from an activator (e.g., a solenoid activator) operated by a user.

Figure 7:
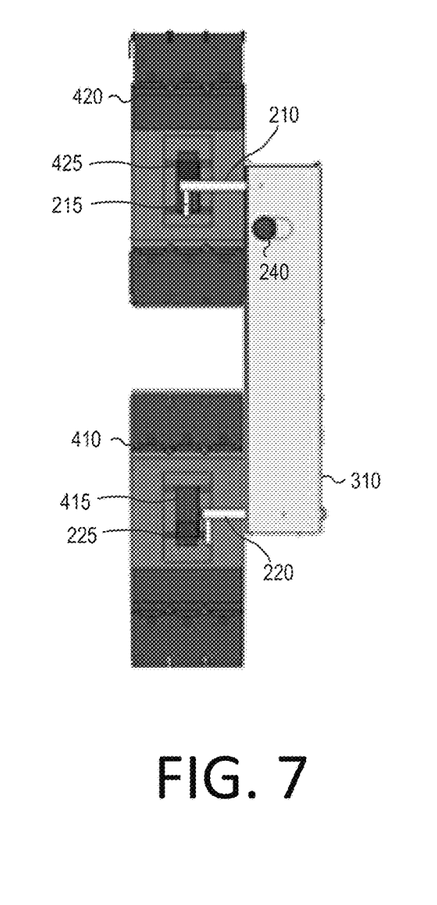

As shown in FIG. 7, now that the top breaker switch 425 is secured in the up position (maintaining the top breaker 420 closed), the bottom breaker switch 415 can now be moved to the down position, opening the bottom breaker 410.

In one disclosed embodiment, the top breaker 420 is a bypass breaker and the bottom breaker 410 is a power breaker. In another embodiment, the top breaker 420 is a power breaker and the bottom breaker 410 is a bypass breaker.

As FIGS. 4-7 show, the disclosed interlock system prevents the bottom and top breaker switches 415, 425 from both being moved to the up position at the same time. In doing so, it prevents the bottom and top breakers 410, 420 from being open at the same time.

Although FIGS. 4-7 show an embodiment in which the breakers 410, 420 are open when the switches 415, 425 are in the down position, and are closed when the switches 415, 425 are in the up position, this is by way of example only. The reverse could be true. In the alternative, one switch 415, 425 could be closed in the up position while the other switch 415, 425 could be closed in the down position.

In any embodiment, however, the arms 210, 220 and the pins 215, 225 are arranged to make certain that the top and bottom breakers 410, 420 cannot both be set to be open at the same time. In particular, the arms 210, 220 should be arranged to prevent the switches 415, 425 from turning to a position that opens the respective breaker 410, 420 unless the other switch 415, 425 is secured in a position that closes the other breaker 410, 420. Likewise, the pins are placed in a position to prevent the control lever 170 from changing orientation unless both switches 415, 425 have set their respective breakers 410, 420 to be closed.

Figure 8:
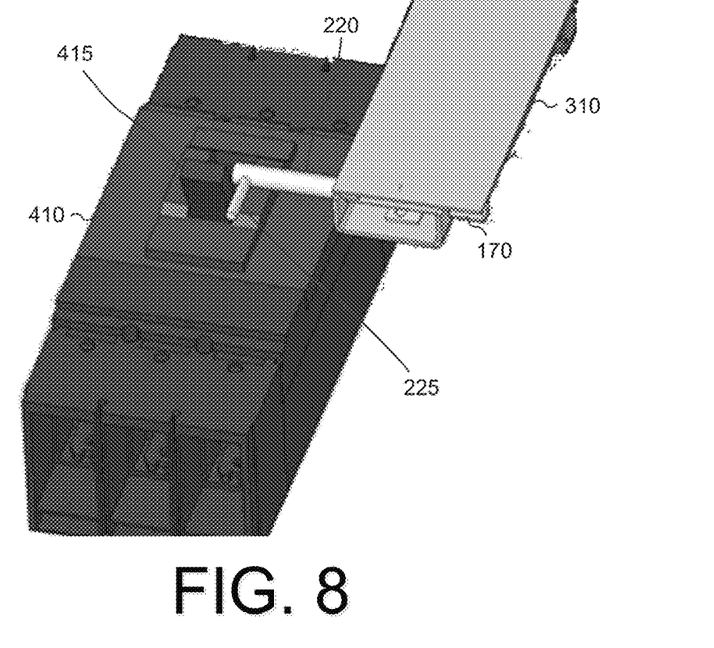
FIG. 8 is a plan view of a lower portion of the interlock system of FIG. 2 according to a disclosed embodiment.

FIG. 8 is a plan view of a lower portion of the interlock system of FIGS. 2 and 3 according to a disclosed embodiment. In particular, FIG. 8 better illustrates how the second pin 225 prevents the control lever 170 from moving into the second orientation when the bottom breaker switch 415 is in the down position (indicating that the bottom breaker 410 is open). In particular, the switch 415 physically gets in the way of the second pin 225, preventing the control lever 170 from moving into the second orientation.

Although FIGS. 1-8 disclose the use of arms 210, 220 and pins 215, 220, alternate embodiments could employ other blockers to block the movement of the switches 415, 425. Such blockers would block one switch 415, 425 from opening its breaker when the control lever 170 was in the first orientation, and would block the other switch 415, 425 from opening its breaker when the control lever was in the second orientation.

Figure 9:
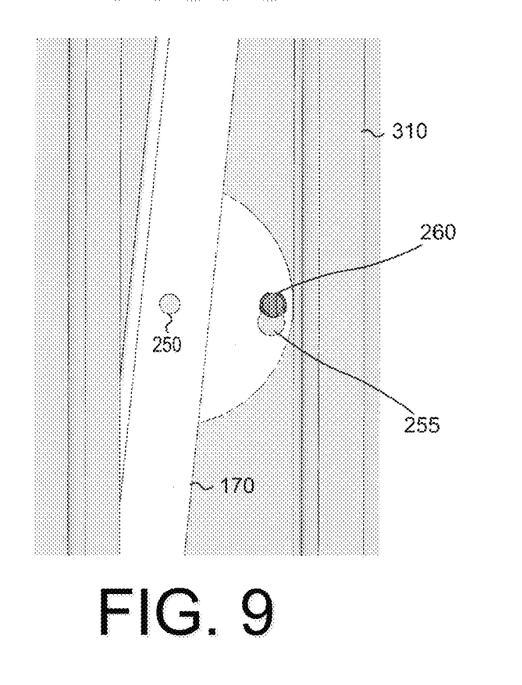
FIG. 9 is a top view of a center portion of the interlock system of FIG. 2 according to a disclosed embodiment.

FIG. 9 is a top view of a center portion of the interlock system of FIG. 2 according to a disclosed embodiment. As shown in FIG. 9, the opening 255 has the shape of a figure eight (i.e., two overlapping circles). Thus, when the control lever 170 is in the first orientation, the locking pin 260 can be inserted into a first half of the figure eight (i.e., one of the overlapping circles) to prevent the control lever 170 from moving to the second orientation. When the locking pin 260 is removed from the opening 255, the control lever 170 can pivot on the pivot 250, moving from the first orientation to the second orientation. At this point, the locking pin 260 can be placed in the second half of the figure eight (i.e., the other overlapping circle) to prevent the control lever 170 from moving back to the first orientation.

The movement of the locking pin 260 is controlled by the solenoid activator 195, which is a user-controlled device, such as a button, a switch, a lever, or the like.

Thus, as shown above, the control lever 170 can only be moved from the first orientation to the second orientation, or vice versa when: (1) both the bottom and top switches 415, 425 are in positions that close the bottom and top breakers 410, 420, (2) the UPS associated with the control lever 170 is in a bypass mode, and (3) the solenoid activator 195 has been activated by the user. As a result, the current interlock system has a triple failsafe to prevent both breakers 410, 420 from being open at the same time.

Method of Operation

Figure 10:
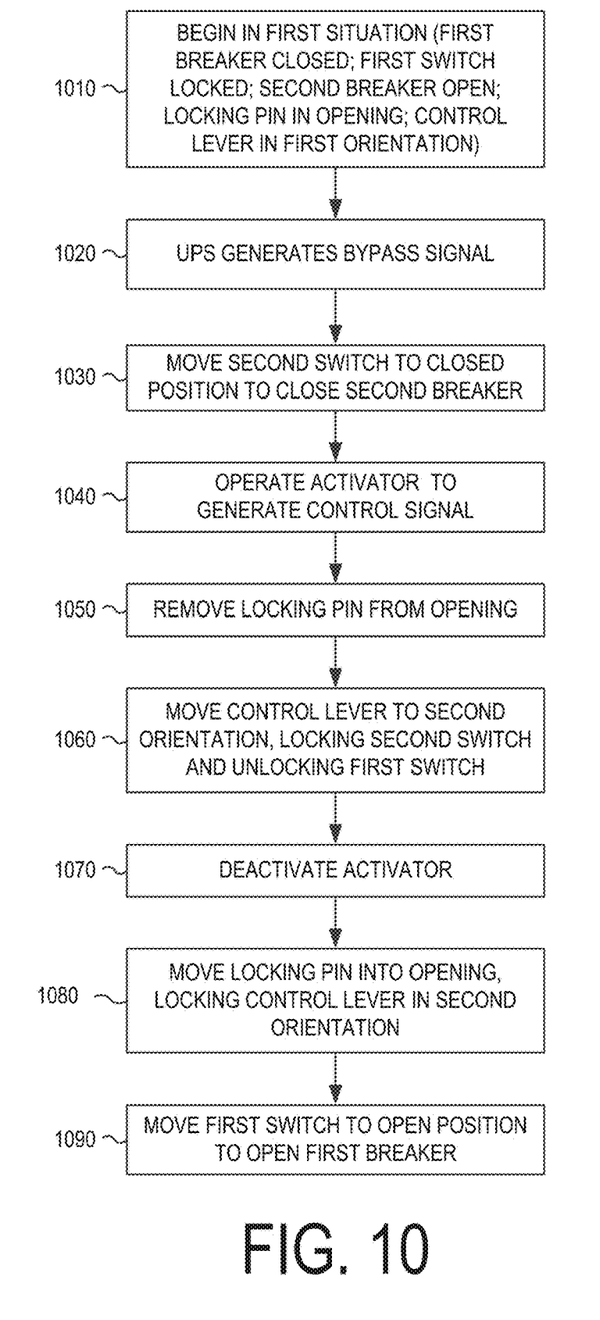
FIG. 10 is a flowchart illustrating the operation of an interlock system according to a disclosed embodiment.

FIG. 10 is a flowchart illustrating the operation of an interlock system according to a disclosed embodiment. As shown in FIG. 10, in this embodiment, the control lever 170 begins in the first orientation (i.e., with a first breaker closed and a second breaker open). In this case, the first switch, associated with the first breaker, is locked, such that the first breaker cannot be opened. (1010) A locking pin is located in an opening of the control lever, fixing the control lever in the first orientation.

A UPS associated with the breakers and the control lever then generates a bypass signal indicating that it should be taken out of the power circuit. (1020) This may be because it is being replaced, serviced, or any other reason. The bypass signal may be generated by a contactor in the UPS that is closed by a technician operating the UPS. In one embodiment, the UPS has an internal bypass system, which, when in operation, will trigger the signal through the closing of a bypass contactor. The bypass contactor is equipped with auxiliary contacts used to obtain this signal. A customer or technician can then put the UPS into bypass mode through a touch screen on the UPS door.

The second switch, associated with the second breaker, is then operated to close the second breaker. (1030) At this point, both breakers are closed.

With both breakers closed, the user then activates an activator to generate a lever release signal indicating that the control lever should be allowed to move. (1040) This activator can be a button, a switch, a lever, or the like.

Since a pin controller is receiving both a lever release signal and a bypass signal, it provides a control signal indicating that the locking pin should move from an extended position to a retracted position, removing the locking pin from the opening, unlocking the control lever. (1050)

Once the locking pin is removed from the opening, and the second switch is in a position that closes the second breaker, the control lever can now be moved from the first orientation to a second orientation. (1060) This serves to lock the second switch in the closed position and unlock the first switch.

It is important to note that in this situation, if the second switch were still in a position that indicated the second breaker was open, an arm of the control lever would prevent the control lever from moving from the first orientation to the second orientation.

With the control lever in the second orientation, the user then deactivates the solenoid activator. (1070) This can be done by releasing the button, flipping the switch, moving the lever, etc.

Once the activator is deactivated, the locking pin moves from the retracted position to the extended position, placing the locking pin into the opening and preventing the control lever from moving from the second orientation into the first orientation. (1080)

Finally, now that the first switch is unlocked, it can be moved to a position that opens the first breaker, and the operation is completed. (1090)

In this operation, the positions of the two breakers are reversed without both breakers ever being open at the same time. Furthermore, given the safeguards in place, it would be impossible for both breakers to be open at the same time.

In this embodiment, when shifting back to connecting the UPS a technician may operate the breakers in reverse of this disclosed procedure and power will be resupplied to the UPS. The contactor from which the signal is gained in the UPS is normally closed so when it shuts down it will remain closed during operation. Once power is changed back to the UPS the technician will take the UPS out of bypass mode and bypass signal will be cut.

Figure 11:
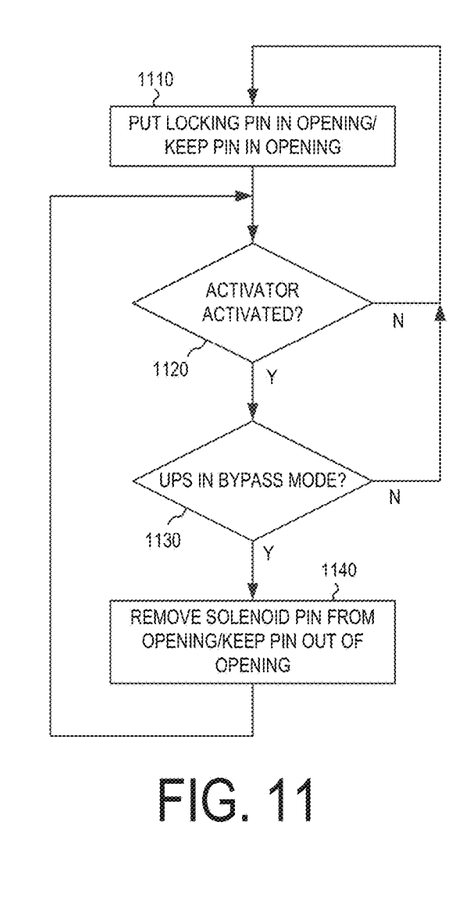
FIG. 11 is a flowchart illustrating the operation of a solenoid in an interlock system according to a disclosed embodiment.

As noted above, the fixer can employ a solenoid for moving the locking pin in and out of the opening. FIG. 11 is a flowchart illustrating the operation of a solenoid in an interlock system according to a disclosed embodiment.

As shown in FIG. 11, the operation begins by putting a locking pin in an opening and keeping the pin in the opening. (1110) In this embodiment, the unpowered solenoid position may be with the pin in an extended position that keeps the pin in the opening, while the powered solenoid position may be with the pin in the retracted position. That way if the power to the solenoid were ever interrupted, the locking system would not fail. However, in alternate embodiments, the unpowered solenoid position may be with the pin in a retracted position, while the powered solenoid position may be with the pin in the extended position.

The solenoid controller then determines whether the solenoid activator has been activated. (1120) One way to accomplish this is by monitoring whether the solenoid controller receives a lever release signal from the solenoid activator.

If the solenoid activator has not been activated, the solenoid controller returns to operation 1110 and keeps the locking pin in the opening.

If, however, the solenoid activator is activated, the solenoid controller then determines whether or not the UPS associated with the solenoid is in a bypass mode. (1130)

If the UPS is not in a bypass mode, the solenoid controller returns to operation 1110 and keeps the locking pin in the opening.

If, however, the UPS is in the bypass mode, the solenoid controller removes the locking pin from the opening and keeps the pin out of the opening, returning to operation 1120 to determine whether the solenoid activator is still activated.

In this embodiment, operations 1120 and 1130 can be performed in either order or could be performed in parallel.

In this way, the locking pin will only be removed from the opening when both the solenoid activator is activated and the UPS is in the bypass mode. If either of these is not true, the locking pin will be inserted into the opening and kept in the opening. This provides further failsafe against the control lever being moved at an inappropriate time.

CONCLUSION

This disclosure is intended to explain how to fashion and use various embodiments in accordance with the invention rather than to limit the true, intended, and fair scope and spirit thereof. The foregoing description is not intended to be exhaustive or to limit the invention to the precise form disclosed. Modifications or variations are possible in light of the above teachings. The embodiment(s) was chosen and described to provide the best illustration of the principles of the invention and its practical application, and to enable one of ordinary skill in the art to utilize the invention in various embodiments and with various modifications as are suited to the particular use contemplated. All such modifications and variations are within the scope of the invention as determined by the appended claims, as may be amended during the pendency of this application for patent, and all equivalents thereof, when interpreted in accordance with the breadth to which they are fairly, legally, and equitably entitled. The various circuits described above can be implemented in discrete circuits or integrated circuits, as desired by implementation.

What is claimed is:

1. A vertical interlock system, comprising:
   a power supply configured to generate a bypass signal when the power supply is in a bypass mode;
   a first breaker connected to the power supply and controlled by a first switch, the first switch having a first open position that opens the first breaker and a first closed position that closes the first breaker;
   a second breaker connected to the power supply and controlled by a second switch, the second switch having a second open position that opens the second breaker and a second closed position that closes the second breaker, the second breaker being located above the first breaker;
   a control lever having a first orientation and a second orientation; and
   a fixer configured to lock the control lever in one of the first and second orientations unless it receives both the bypass signal and a lever release signal,
   wherein
   when the control lever is in the first orientation the first switch is locked in the first closed position,
   when the control lever is in the second orientation the second switch is locked in the second closed position,
   when the first switch is in the first open position, the control lever cannot be placed in the first orientation, and
   when the second switch is in the second open position, the control lever cannot be placed in the second orientation.

2. The vertical interlock system of claim 1, wherein
   one of the first breaker and the second breaker is a power breaker connected in series with the power supply, and
   the other of the first breaker and the second breaker is a bypass breaker connected in parallel with the power supply.

3. The vertical interlock system of claim 2, wherein
   the bypass breaker is located in parallel with the power supply and the power breaker.

4. The vertical interlock system of claim 1, wherein the control arm further includes
   a first arm affixed to a first end of the control lever; and
   a second arm affixed to a second end of the control lever opposite to the first end.

5. The vertical interlock system of claim 4, wherein the control arm further includes
   a first blocker attached to the first arm, the first blocker being configured to prevent the first switch from moving from the first closed position to the first open position when the control lever is in the first orientation, and
   a second blocker attached to the second arm, the second blocker being configured to prevent the second switch from moving from the second closed position to the second open position when the control lever is in the second orientation.

6. The vertical interlock system of claim 5, wherein
   the first blocker is a first pin extending perpendicularly from the first arm, and
   the second blocker is a second pin extending perpendicularly from the second arm.

7. The vertical interlock system of claim 1, wherein
   the fixer includes a solenoid configured to move a locking pin from a first pin position to a second pin position in response to the bypass signal and the lever release signal, and
   the control lever includes an opening located proximate to a midpoint of the control lever, the opening being configured to receive the locking pin when the locking pin is in the second pin position, and
   when the locking pin is in the second pin position and is inserted in the opening, the control lever is locked and cannot change between the first and second orientations.

8. The vertical interlock system of claim 7, wherein
   the fixer further includes
   a solenoid activator configured to generate the lever release signal when activated; and
   a solenoid controller configured to generate a solenoid control signal upon receiving both the bypass signal and the lever release signal, and
   the solenoid is configured to
   move the locking pin to a second pin position when it receives the solenoid control signal, and
   move the locking pin to the first pin position when it does not receive the solenoid control signal.

9. The vertical interlock system of claim 7, wherein
the locking pin can only be placed into the opening when the control lever is in the first orientation or the second orientation.

10. The vertical interlock system of claim 7, wherein
the opening has an opening shape of first and second overlapping shapes,
when the control lever is in the first orientation, the locking pin is configured to fit into the first overlapping shape when the locking pin is in the second pin position, and
when the control lever is in the second orientation, the locking pin is configured to fit into the second overlapping shape when the locking pin is in the second pin position.

11. A vertical interlock system, comprising:
a power supply configured to generate a bypass signal when the power supply is in a bypass mode;
a first breaker connected to the power supply and controlled by a first switch, the first switch having a first open position and a first closed position;
a second breaker connected to the power supply and controlled by a second switch, the second switch having a second open position and a second closed position, the second breaker being located above the first breaker;
a solenoid configured to move a locking pin from a first pin position to a second pin position in response to a solenoid control signal;
a solenoid activator configured to generate a lever release signal when activated;
a solenoid controller configured to generate the solenoid control signal upon receiving both the bypass signal and the lever release signal;
a control lever having a first orientation and a second orientation, the control lever including
a first arm affixed to a first end of the control lever;
a second arm affixed to a second end of the control lever opposite to the first end;
a center pivot located proximate to a midpoint of the control lever, the control lever being configured to partially rotate around the pivot; and
an opening located proximate to a midpoint of the control lever, the opening being configured to receive the locking pin when the locking pin is in the second pin position,
wherein
when the control lever is in the first orientation the first switch is locked in the first closed position,
when the control lever is in the second orientation the second switch is locked in the second closed position,
when the first switch is in the first open position, the control lever cannot be placed in the first orientation,
when the second switch is in the second open position, the control lever cannot be placed in the second orientation, and
when the locking pin is in the second pin position and is inserted in the opening, the control lever is locked and cannot change between the first and second orientations.

12. The vertical interlock system of claim 11, wherein
one of the first breaker and the second breaker is a power breaker connected in series with the power supply, and
the other of the first breaker and the second breaker is a bypass breaker connected in parallel with the power supply.

13. The vertical interlock system of claim 11, wherein
the bypass switch is located in parallel with the power supply and the power switch.

14. The vertical interlock system of claim 11, wherein the solenoid is configured to
move the locking pin to the second pin position when it receives the solenoid control signal, and
move the locking pin to the first pin position when it does not receive the solenoid control signal.

15. The vertical interlock system of claim 14, wherein
the first pin position is an extended position, and
the second pin position is a retracted position.

16. The vertical interlock system of claim 14, wherein
the first pin position is a retracted position, and
the second pin position is an extended position.

17. The vertical interlock system of claim 11, wherein
the locking pin can only be placed into the opening when the control lever is in the first orientation or the second orientation.

18. The vertical interlock system of claim 11, wherein
the opening has an opening shape of first and second overlapping shapes,
when the control lever is in the first orientation, the locking pin is configured to fit into the first overlapping shape when the locking pin is in the second pin position, and
when the control lever is in the second orientation, the locking pin is configured to fit into the second overlapping shape when the locking pin is in the second pin position.

19. The vertical interlock system of claim 11, wherein
the first arm is attached to a first pivot, the first pivot including
a first arm hole located in the first arm,
a first control lever hole located in the control lever, and
a first fixed fastener located in the first arm hole and the first control lever hole, and
the second arm is attached to a second pivot, the second pivot including
a second arm hole located in the second arm,
a second control lever hole located in the control lever, and
a second fixed fastener located in the second arm hole and the second control lever hole.

20. A vertical interlock system, comprising:
a power supply configured to generate a bypass signal when the power supply is in a bypass mode;
a first breaker connected to the power supply and controlled by a first switch, the first switch having a first open position and a first closed position;
a second breaker connected to the power supply and controlled by a second switch, the second switch having a second open position and a second closed position, the second breaker being located above the first breaker;
a solenoid configured to move a locking pin from a first pin position to a second pin position in response to a solenoid control signal;
a solenoid activator configured to generate a lever release signal when activated;
a solenoid controller configured to generate the solenoid control signal upon receiving both the bypass signal and the lever release signal;
a control lever having a first orientation and a second orientation, the control lever including
a first arm affixed to a first end of the control lever;
a second arm affixed to a second end of the control lever opposite to the first end;

a center pivot located proximate to a midpoint of the control lever, the control lever being configured to partially rotate around the pivot; and an opening located proximate to a midpoint of the control lever, the opening being configured to receive the locking pin when the locking pin is in the second pin position, wherein the first arm includes a first blocker configured to prevent the first switch from moving from the first closed position to the first open position when the control lever is in the first orientation, the second arm includes a second blocker configured to prevent the second switch from moving from the second closed position to the second open position when the control lever is in the second orientation, the first blocker is a first pin extending perpendicularly from the first arm, the second blocker is a second pin extending perpendicularly from the second arm when the control lever is in the first orientation the first switch is locked in the first closed position, when the control lever is in the second orientation the second switch is locked in the second closed position, when the first switch is in the first open position, the control lever cannot be placed in the first orientation, when the second switch is in the second open position, the control lever cannot be placed in the second orientation, and when the locking pin is in the second pin position and is inserted in the opening, the control lever is locked and cannot change between the first and second orientations.

* * * * *